United States Patent [19]
Farleigh

[11] Patent Number: 6,075,641
[45] Date of Patent: Jun. 13, 2000

[54] METHOD AND APPARATUS FOR REDIRECTING A LIGHT BEAM

[75] Inventor: Scott E. Farleigh, Denver, Colo.

[73] Assignee: Lucent Technologies Inc., Murray Hill, N.J.

[21] Appl. No.: 09/197,599

[22] Filed: Nov. 23, 1998

[51] Int. Cl.$^7$ ........................................................ G02F 1/03
[52] U.S. Cl. ............................................. 359/253; 359/246
[58] Field of Search ..................................... 359/245, 246, 359/252, 253, 237

[56] References Cited

U.S. PATENT DOCUMENTS

| | | | |
|---|---|---|---|
| 3,633,126 | 1/1972 | Martin et al. | 331/94.5 |
| 4,126,049 | 11/1978 | Cotter | 73/702 |
| 4,521,162 | 6/1985 | Parkinson | 417/138 |
| 4,922,095 | 5/1990 | Gergely | 250/227.17 |
| 4,950,885 | 8/1990 | Kershaw | 250/227.25 |
| 5,287,365 | 2/1994 | Nielsen | 372/9 |

*Primary Examiner*—Georgia Epps
*Assistant Examiner*—Suzanne Letendre

[57] ABSTRACT

The present system for redirecting a light beam makes use of a transparent pressure vessel that is filled with a compressible fluid, whose refractive index changes as a function of the pressure applied to the compressible fluid to redirect the path of a light beam that is transmitted through the transparent pressure vessel. An incident beam of coherent monochromatic light is applied to a transparent segment of a wall of the transparent pressure vessel, where this incident light beam is refracted by the compressible fluid contained in the transparent pressure vessel. The refracted light beam traverses the transparent pressure vessel and exits the transparent pressure vessel at a point along the opposite wall of the transparent pressure vessel as determined by the refractive index of the compressible fluid, which is determined by the pressure of the compressible fluid. The pressure of the compressible fluid is controlled by using a pump that is fluidically connected to the transparent pressure vessel. By varying the pressure of the compressible fluid and thus its refractive index, the exit point of the refracted light beam on the wall of the transparent pressure vessel can be precisely controlled. The incident light beam can therefore be switched among a plurality of light sensing or optically transmissive elements that are arrayed in a linear array along the wall of the transparent pressure vessel by simply regulating the pressure applied to the compressible fluid.

10 Claims, 2 Drawing Sheets

METHOD AND APPARATUS FOR REDIRECTING A LIGHT BEAM

CROSS-REFERENCE TO RELATED APPLICATIONS

This application is related to U.S. patent application Ser. No. 09/197,651, titled Noninvasive Pressure Sensor, which is filed on the same date as the present application now U.S. Pat. No. 6,016,703.

FIELD OF THE INVENTION

This invention relates to a system that provides the capability to redirect the path of a light beam to enable the manipulation of the light beam for data processing purposes without having to convert the light beam to an electrical signal for processing or without having to mechanically move the light waveguide to provide the data processing function.

PROBLEM

It is a problem in the field of optical systems to redirect the path of a light beam for data processing purposes without having to convert the light beam to an electrical signal for processing or without having to mechanically move the light waveguide to provide the data processing function. The manipulation of a light beam is problematic since it cannot be easily accomplished, yet the light beam has characteristics that render it a desirable data transmission medium.

One example of optically based systems is the data communication systems that function to transmit data signals between selected endpoints through a plurality of interconnected switching elements. Existing optically based communications systems tend to be complex in that the data transmission path comprises a plurality of segments comprising optically based inter-switch data transmission segments, with the switching elements interconnected by these inter-switch data transmission segments being electrically based. The inter-switch segments are typically optical fiber transmission media, which are terminated on the switch elements. The switch elements convert the light beam received from the optical fiber into an electrical signal, so that the switch element can switch the electrical signal to an appropriate one of a plurality of optical fiber inter-switch transmission elements. The switch element then converts the electrical signals back to a light beam for this next inter-switch data transmission segment of the data transmission path. The necessity to convert the data signals between the optical format and the electrical format represents an inefficiency and expense in data communication systems that must be endured since there is a lack of systems that can effectively switch a signal while in optical form.

Another application for optically based systems is disclosed in U.S. Pat. No. 5,721,612, issued Feb. 24, 1998 to Samuel J. Anderson, wherein an optical pressure sensor is implemented using an optical link to couple light from an optical interferometer to a pressure sensing element and to couple the reflected light back to an interferometer over another optical link. The optical links use a set of holographic reflectors to guide the light through the optical link. In addition, the pressure sensing element comprises a Fabry-Perot cavity which responds to pressure changes by changing the length of the optical path, thereby causing phase changes in the reflected light beam. The detected phase changes in this signal can be used to determine the pressure that is applied to the pressure sensing element.

SOLUTION

The present system for redirecting a light beam solves the above noted problems and represents an advance in the art in that it makes use of a transparent pressure vessel that is filled with a compressible fluid, whose refractive index changes as a function of the pressure applied to the compressible fluid. The change in the refractive index redirects the path of a light beam that is transmitted through the transparent pressure vessel in a predictable manner. An incident beam of coherent monochromatic light is applied to a transparent segment of a wall of the transparent pressure vessel, where this incident light beam is refracted by the compressible fluid contained in the transparent pressure vessel. The refracted light beam traverses the transparent pressure vessel and exits the transparent pressure vessel at a point along the opposite wall of the transparent pressure vessel as determined by the refractive index of the compressible fluid, which is determined by the pressure of the compressible fluid. The pressure of the compressible fluid is controlled by using a pump that is fluidically connected to the transparent pressure vessel. By varying the pressure of the compressible fluid and thus its refractive index, the exit point of the refracted light beam on the wall of the transparent pressure vessel can be precisely controlled. The incident light beam can therefore be switched among a plurality of light sensing or optically transmissive elements that are arrayed in a linear array along the wall of the transparent pressure vessel by simply regulating the pressure applied to the compressible fluid.

DETAILED DESCRIPTION

Figure 1:
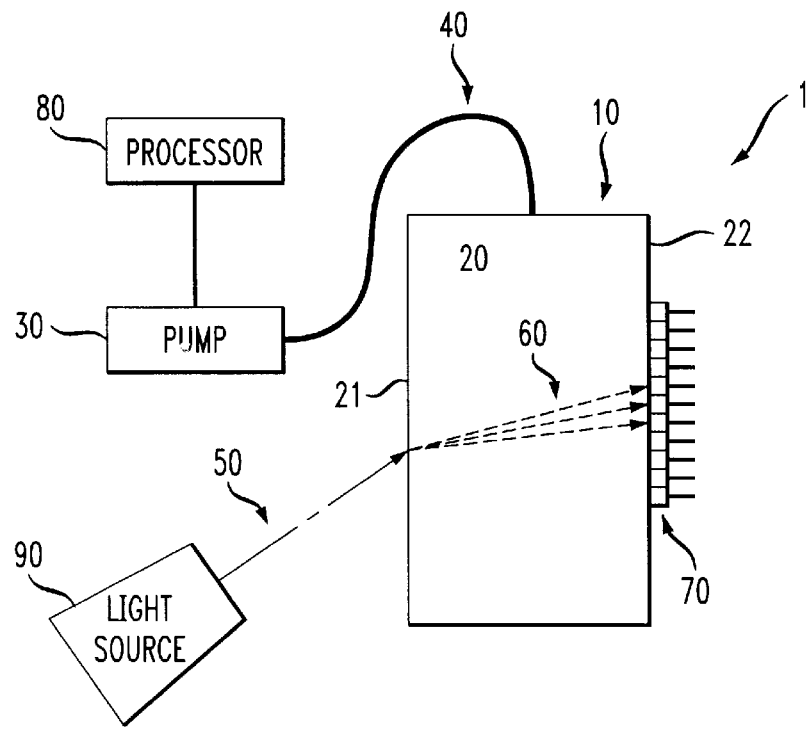
FIG. 1 illustrates in block diagram form the overall architecture of the present system for redirecting a light beam.

The overall architecture of the present system for redirecting a light beam 1 is illustrated in block diagram form in FIG. 1. The system for redirecting a light beam 1 comprises a transparent pressure vessel 10 that is filled with a compressible fluid 20, whose refractive index changes as a function of the pressure applied to the compressible fluid 20 to redirect the path of an incident light beam 50 that is transmitted through the transparent pressure vessel 10. An incident beam of coherent monochromatic light 50 is generated by light source 90 and applied to a transparent segment of a wall 21 of the transparent pressure vessel 10. The light source 90 produces a beam of coherent monochromatic light, and can be a laser or a light guide, such as an optical fiber, that transmits the beam of coherent monochromatic light from some remotely located light source. In either case, the use of a coherent monochromatic light beam is preferred to produce a uniform redirection of the incident light beam in the transparent pressure vessel 10 and to have narrow dispersion of the light beam as it traverses the transparent pressure vessel 10. The minimization of dispersion of the light beam is important to avoid ambiguous output signals produced by the light receiving elements 70 which are described below.

Figure 3:
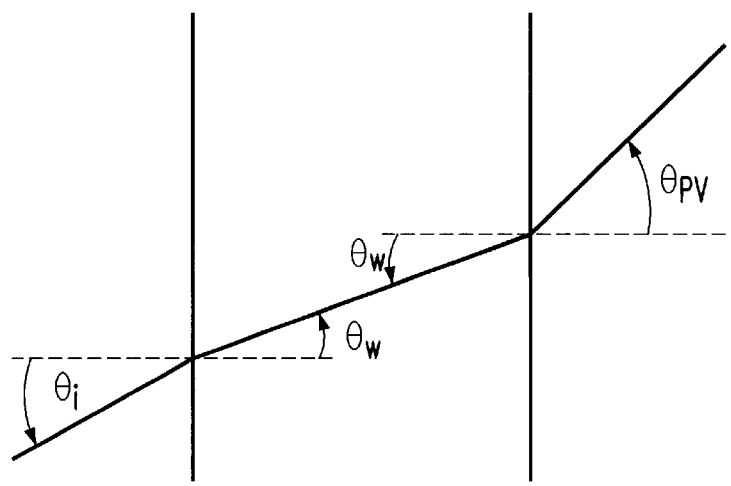
FIG. 3 illustrates the refraction of the light beam within the wall of the pressure vessel.
Figure 2:
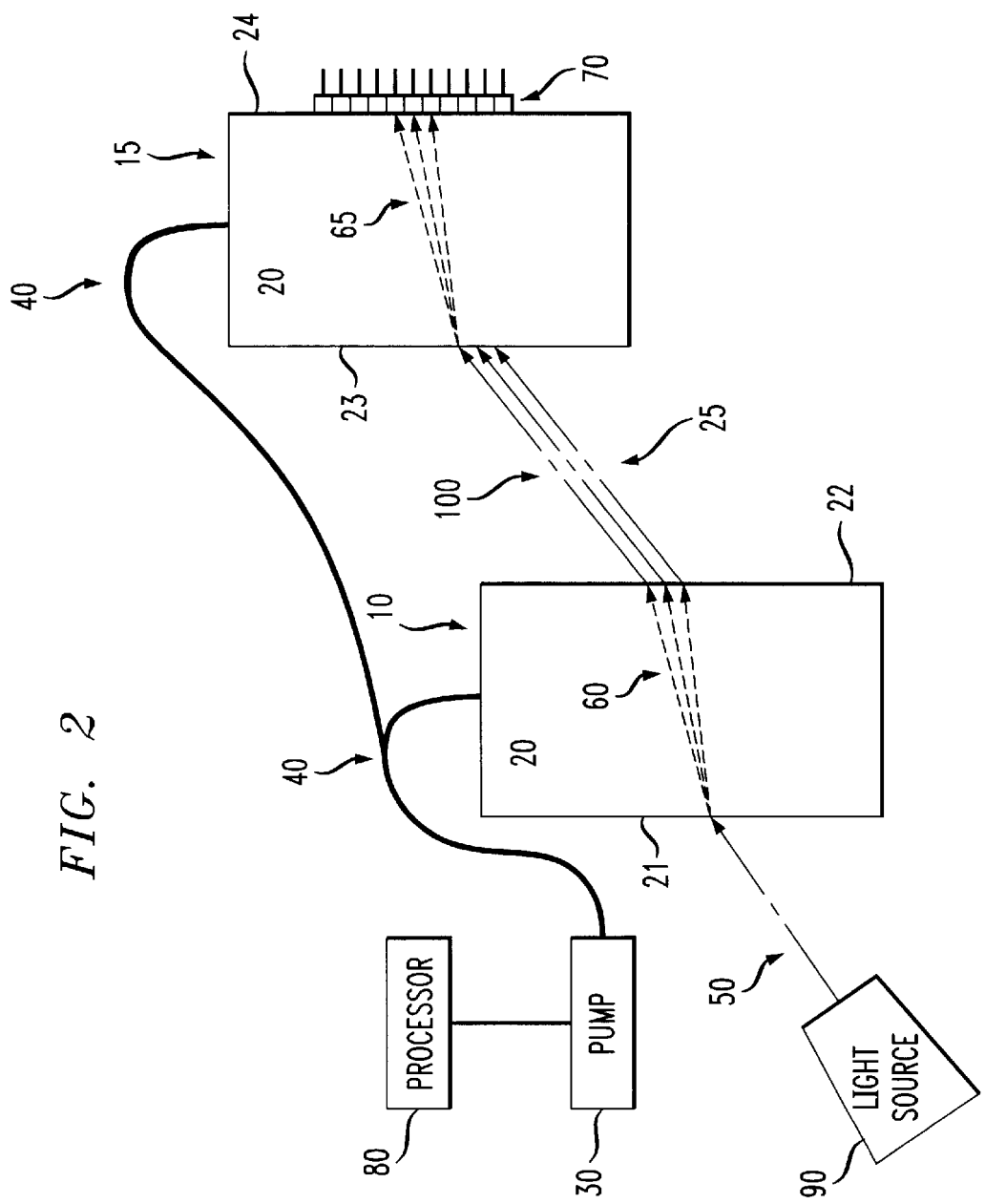
FIG. 2 illustrates in block diagram form an alternative embodiment of the present system for redirecting a light beam.

FIG. 3 illustrates the refraction of the incident light beam 50 within the wall 21 of the pressure vessel 10. Since the walls of the transparent pressure vessel 10 have a finite thickness, they serve to refract the incident light beam 50 as the incident light beam 50 traverses the extent of wall 21. As shown in FIG. 3, each interface between two materials of different index of refraction causes the incident light beam 50 to be refracted. As an example, the ambient environment around the transparent pressure vessel 10 is assumed to be air or a vacuum, with an index of refraction of approximately n=1.0. The transparent pressure vessel 10 is constructed of a transparent, yet sturdy material, such as plastic or glass, which has an index of refraction of between 1.3 and 1.6. Finally, the compressible fluid 20 within the transparent pressure vessel 10 has an index of refraction and, for example, in the case of sulfur dioxide, n=1.000686. Accordingly, Snell's Law provides that:

$$n_{air}\sin\theta_i = n_{gas}\sin\theta_{pv} = n_{wall}\sin\theta_w$$

Thus, by rearranging terms:

$$\theta_{PV} = \sin^{-1}\left[\sin\theta_i \frac{n_{air}}{n_{gas}}\right]$$

Where the term "gas" refers to the compressible fluid.

The index of refraction of a fluid is dependent on both temperature and pressure. The index of refraction of a compressible fluid for a given temperature t is given by the formula:

$$n_t - 1 = \frac{n_0 - 1}{1 + \alpha t} * \frac{p}{760}$$

where $n_t$ is the index of refraction for temperature t, $n_o$ is the index of refraction for temperature=0, $\alpha$ is the coefficient of expansion of the gas with temperature and p is the pressure of the gas in millimeters of mercury. Thus, as can be seen from this equation, the index of refraction of the compressible fluid (also termed "gas") is linearly related to the applied pressure if the temperature is maintained a constant. Thus:

$$n_{air}(t, P) - 1 = \frac{[n_{air}(0, 760) - 1]}{1 + \alpha_{air}t}\left(\frac{P_{air}}{760}\right)$$

$$n_{gas}(t, P) - 1 = \frac{[n_{gas}(0, 760) - 1]}{1 + \alpha_{gas}t}\left(\frac{P_{gas}}{760}\right)$$

Using this relationship, the angle $\theta_{PV}$ can be determined in terms of the pressure, index of refraction and incident angle $\theta_i$.

Let $n_{air}(0,760) = n_{oair}$ $n_{gas}(0,760) = n_{ogas}$

Assuming thermal equilibrium:

$$\theta_{pv} = \sin^{-1}\left[\frac{1 + \alpha_{air}t + [n_{oair} - 1]\frac{P_{air}}{760}}{1 + \alpha_{gas}t + [n_{ogas} - 1]\frac{P_{gas}}{760}}\left(\frac{1 + \alpha_{gas}t}{1 + \alpha_{air}t}\right)\sin\theta_i\right]$$

If air is at 1 atm:

$$\theta_{pv} = \sin^{-1}\left[\frac{1 + \alpha_{air}t + [n_{oair} - 1]}{1 + \alpha_{gas}t + [n_{ogas} - 1]\frac{P_{gas}}{760}}\left(\frac{1 + \alpha_{gas}t}{1 + \alpha_{air}t}\right)\sin\theta_i\right]$$

If gas in pressure vessel is air:

$$\theta_{pv} = \sin^{-1}\left[\frac{\frac{\sin\theta_i}{(1 - P/760)}}{n_{oair} + \alpha_{air}t} + 1\right]$$

The selection of a fluid that has a high base index of refraction results in the greatest deflection of the refracted light beam. Since the deflection of the light beam is small in magnitude and a function of the wavelength of the incident light beam, a coherent monochromatic source of light is necessary to ensure that the resultant deflection of the light beam is solely a result of the refractive index of the compressible fluid and can also be precisely determined without significant expansion of the incident light beam.

The incident light beam 50 is refracted by the compressible fluid 20 contained in the transparent pressure vessel 10. The refracted light beam 60 traverses the transparent pressure vessel 10 and exits the transparent pressure vessel 10 at a point along the opposite wall 22 of the transparent pressure vessel 10 as determined by the refractive index of the compressible fluid 20, which is determined by the pressure of the compressible fluid 20. To illustrate the variability of the refraction of the incident light beam 50, a plurality of refracted light paths 60 are illustrated as dotted lines in FIG. 1 to show that the path of the refracted light beam 60 can vary.

The pressure of the compressible fluid 20 is controlled by processor 80 activating a pump 30 that is fluidically connected 40 to the transparent pressure vessel 10. By varying the pressure of the compressible fluid 20 and thus its refractive index, the exit point of the refracted light beam 60 on the wall 22 of the transparent pressure vessel 10 can be precisely controlled. The incident light beam 50 can therefore be switched among a plurality of light sensing or optically transmissive elements that are arrayed in a linear array 70 along the wall 22 of the transparent pressure vessel 10 by simply regulating the pressure applied to the compressible fluid 20. Typically, the refracted light beam 60 is directed to a selected one of a plurality of linearly arranged optical fibers to thereby switch the incident light beam 50 to a selected one of a plurality of destination optical fibers 70.

ALTERNATE EMBODIMENT

A greater deflection of the refracted light beam 60 of FIG. 1 can be achieved by the use of a plurality of the transparent pressure vessels 10, 15, shown in Figure which function to expand the deflection of the incident light beam 50. In particular, the incident light beam 50 is refracted by the compressible fluid 20 at the interface between the transparent wall 21 and the ambient environment in a predetermined direction, in a single dimension. Thus, the range of light beam deflections that can be effected by this system for redirecting a light beam 1 are linear in nature and cover a predetermined range, as a function of the range of pressures that can be applied to the compressible fluid 20. Thus, the output light beam 100 from this first transparent pressure vessel 10 can be transmitted to another transparent pressure vessel 15 that is also connected to the pump 30 and fluid conduit 40 to again refract the light beam, thereby extending the deflection of the incident light beam by passing the light beam through successive transparent pressure vessels 10, 15. Thus, the once refracted light beam exits the first transparent pressure vessel 10 via wall 22 and traverses the space 25 between the intervening transparent pressure vessels 10, 15 to enter the second transparent pressure vessel 15 via wall 23. Once the light beam traverses the pressurized compressible fluid 20 contained in the second transparent pressure vessel 15, it exits the wall 24 where it is incident on light receiving elements 70 that are mounted on the second wall 24 of the second transparent pressure vessel 15.

SUMMARY

Thus, the transparent pressure vessel is filled with a compressible fluid, whose refractive index changes as a function of the pressure applied to the compressible fluid, to redirect the path of an incident beam of coherent monochromatic light that is applied to a transparent segment of a wall of the transparent pressure vessel. The incident light beam is refracted by the compressible fluid contained in the transparent pressure vessel and exits the transparent pressure vessel at a point along the opposite wall of the transparent pressure vessel as determined by the refractive index of the compressible fluid.

What is claimed is:

1. A system for redirecting a beam of light, comprising:
    a pressure vessel for containing a compressible fluid and having first and second transparent apertures located on respective opposing walls thereof;
    pressure regulating means, fluidically connected to said pressure vessel, for regulating a pressure of said compressible fluid;
    light source means for applying a monochromatic coherent light beam to said compressible fluid via said first transparent aperture; and
    a light receiver, located juxtaposed to said second transparent aperture, for receiving said monochromatic coherent light beam as it exits said pressure vessel via said second transparent aperture.

2. The system for redirecting a beam of claim 1 wherein said pressure regulating means comprises:
    a pump, having an inlet and an outlet, for generating a predetermined pressure in said compressible fluid in response to control signals applied to said pump;
    a conduit for fluidically interconnecting said outlet of said pump with said pressure vessel; and
    a processor for regulating operation of said pump to generate said predetermined pressure by applying said control signals to said pump.

3. The system for redirecting a beam of claim 1 wherein said light receiver comprises:
    a plurality of light detectors for generating electrical signals in response to receipt of said light beam.

4. The system for redirecting a beam of claim 1 wherein said light receiver comprises:
    a plurality of light transmission means for retransmitting said light beam in response to receipt of said light beam.

5. The system for redirecting a beam of claim 1 further comprising:
    second pressure vessel for containing a compressible fluid and having first and second transparent apertures located on respective opposing walls thereof, fluidically connected to said pressure regulating means and juxtaposed to said pressure vessel for receiving in said first wall of said second pressure vessel a light beam that exits said second wall of said pressure vessel.

6. A method for redirecting a beam of light, comprising the steps of:
    containing a compressible fluid in a pressure vessel having first and second transparent apertures located on respective opposing walls thereof;
    regulating a pressure of said compressible fluid via a conduit fluidically connected to said pressure vessel;
    applying a monochromatic coherent light beam to said compressible fluid via said first transparent aperture; and
    receiving, at a light receiver located juxtaposed to said second transparent aperture, said monochromatic coherent light beam as it exits said pressure vessel via said second transparent aperture.

7. The method for redirecting a beam of light of claim 6 wherein said step of regulating comprises:
    activating a pump, having an inlet and an outlet and connected to said pressure vessel by said conduit, to generate a predetermined pressure of said compressible fluid, in response to control signals applied thereto.

8. The method for redirecting a beam of light of claim 6 wherein said step of receiving comprises:
    positioning a plurality of light detectors on said second wall to generate electrical signals in response to receipt of said light beam.

9. The method for redirecting a beam of light of claim 6 wherein said step of receiving comprises:
    positioning a plurality of light transmission elements on said second wall to retransmit said light beam in response to receipt of said light beam.

10. The method for redirecting a beam of light of claim 6 further comprising the step of:
    containing said compressible fluid in a second pressure vessel having first and second transparent apertures located on respective opposing walls and juxtaposed to said first pressure vessel for receiving in said first wall of said second pressure vessel a light beam that exits said second wall of said pressure vessel.

* * * * *